United States Patent
Kandukuri et al.

(10) Patent No.: US 10,496,951 B1
(45) Date of Patent: Dec. 3, 2019

(54) PERSISTENT RETURN CART

(71) Applicant: Amazon Technologies, Inc., Seattle, WA (US)

(72) Inventors: Mahender Kandukuri, Secunderabad (IN); Mahesh Naidu, Visakhapatnam (IN); Bharath Gourneni, Karimnagar (IN); Kapil Dontula, Siddipet (IN); Sharad Dashrath Gang, Hyderabad (IN)

(73) Assignee: Amazon Technologies, Inc., Seattle, WA (US)

(*) Notice: Subject to any disclaimer, the term of this patent is extended or adjusted under 35 U.S.C. 154(b) by 1205 days.

(21) Appl. No.: 14/694,955

(22) Filed: Apr. 23, 2015

(51) Int. Cl.
 *G06Q 30/00* (2012.01)
 *G06Q 10/08* (2012.01)
 *G06Q 30/06* (2012.01)

(52) U.S. Cl.
 CPC ..... *G06Q 10/0837* (2013.01); *G06Q 30/0635* (2013.01); *G06Q 30/0641* (2013.01)

(58) Field of Classification Search
 CPC ........... G06Q 30/0635; G06Q 10/0837; G06Q 30/0641
 See application file for complete search history.

(56) References Cited

U.S. PATENT DOCUMENTS

| | | | |
|---|---|---|---|
| 5,745,681 A | | 4/1998 | Levine et al. |
| 6,052,107 A | * | 4/2000 | Montijo ................. G09G 5/395 715/716 |
| 7,058,581 B1 | * | 6/2006 | Young .................... G06Q 10/08 221/7 |
| 7,428,988 B1 | * | 9/2008 | Starr ...................... G06Q 30/06 235/383 |
| RE42,177 E | * | 3/2011 | Hauser ................... G06Q 30/06 235/375 |
| 8,108,269 B2 | * | 1/2012 | Wechsel ............ G06Q 10/0837 705/28 |
| 8,156,007 B1 | | 4/2012 | Anthony et al. |

(Continued)

OTHER PUBLICATIONS

Gerald L. Lohse et al. "Electronic Shopping", Communications of the ACM, Jul. 1998 / vol. 41, No. 7, pp. 81-88. (Year: 1998).*

(Continued)

*Primary Examiner* — Naeem U Haq
(74) *Attorney, Agent, or Firm* — Kilpatrick Townsend & Stockton LLP

(57) ABSTRACT

An electronic marketplace, or other website, may be configured to support customer returns using a "return cart," allowing a user to combine items, purchased in different transactions, in a single return. In some cases, the user may be able to browse a purchase history including several different orders, and select items from different orders to add to the return cart. The electronic marketplace may process the combined returns as a single transaction and provide an identifier that is common to all the items in the combined return, such as a return number, a shipping number/label, etc. In some examples, the return cart may be persistent and/or associated with a user account, thereby allowing it to be accessible at different times and/or from different devices. A return cart may also be combined with a "shopping cart," which allows the customer to purchase, exchange and/or return items in a single transaction.

18 Claims, 10 Drawing Sheets

(56) References Cited

U.S. PATENT DOCUMENTS

| | | | | |
|---|---|---|---|---|
| 8,311,895 B1* | 11/2012 | Murugan | | G06Q 50/28 705/26.1 |
| 8,386,337 B2* | 2/2013 | Siegel | | G06Q 10/087 705/14.56 |
| 9,292,824 B1* | 3/2016 | Freeman | | G06Q 10/0837 |
| 9,761,061 B1* | 9/2017 | Bussell | | G07B 17/00024 |
| 2002/0013744 A1* | 1/2002 | Tsunenari | | G06Q 10/087 705/28 |
| 2002/0046056 A1* | 4/2002 | Demarco | | G06Q 10/083 705/330 |
| 2002/0147732 A1* | 10/2002 | Lee | | G06F 17/30286 |
| 2003/0004798 A1* | 1/2003 | McAuliffe | | G06Q 30/02 705/14.23 |
| 2004/0143519 A1* | 7/2004 | Siegel | | G06Q 10/087 705/28 |
| 2004/0153379 A1* | 8/2004 | Joyce | | G06Q 10/08 705/28 |
| 2004/0210493 A1* | 10/2004 | Sherman | | G06Q 10/087 705/28 |
| 2004/0225573 A1* | 11/2004 | Ling | | G06Q 10/08 705/26.1 |
| 2005/0192816 A1* | 9/2005 | Wechsel | | G06Q 10/08 705/28 |
| 2006/0149577 A1* | 7/2006 | Stashluk, Jr. | | G06Q 10/0837 |
| 2012/0084135 A1* | 4/2012 | Nissan | | G06Q 30/0238 705/14.38 |
| 2016/0140487 A1* | 5/2016 | Tibbs | | G06Q 10/0837 705/330 |

OTHER PUBLICATIONS

PM, "USPS eases 'e-turns'" Catalog Age 16.13: 6. Penton Media, Inc., Penton Business Media, Inc. (Year: 1999).*

\* cited by examiner

PERSISTENT RETURN CART

BACKGROUND

In the field of e-commerce, consumers may browse and purchase a wide variety of products. In some cases, websites that allow consumers to purchase products also support the customers in returning products, such as when the products that are received by the customers are unsatisfactory for some reason. This can involve, for example, providing the customer with a return shipping label

BRIEF DESCRIPTION OF THE DRAWINGS

Various embodiments in accordance with the present disclosure will be described with reference to the drawings, in which.

DETAILED DESCRIPTION

Figure 1:
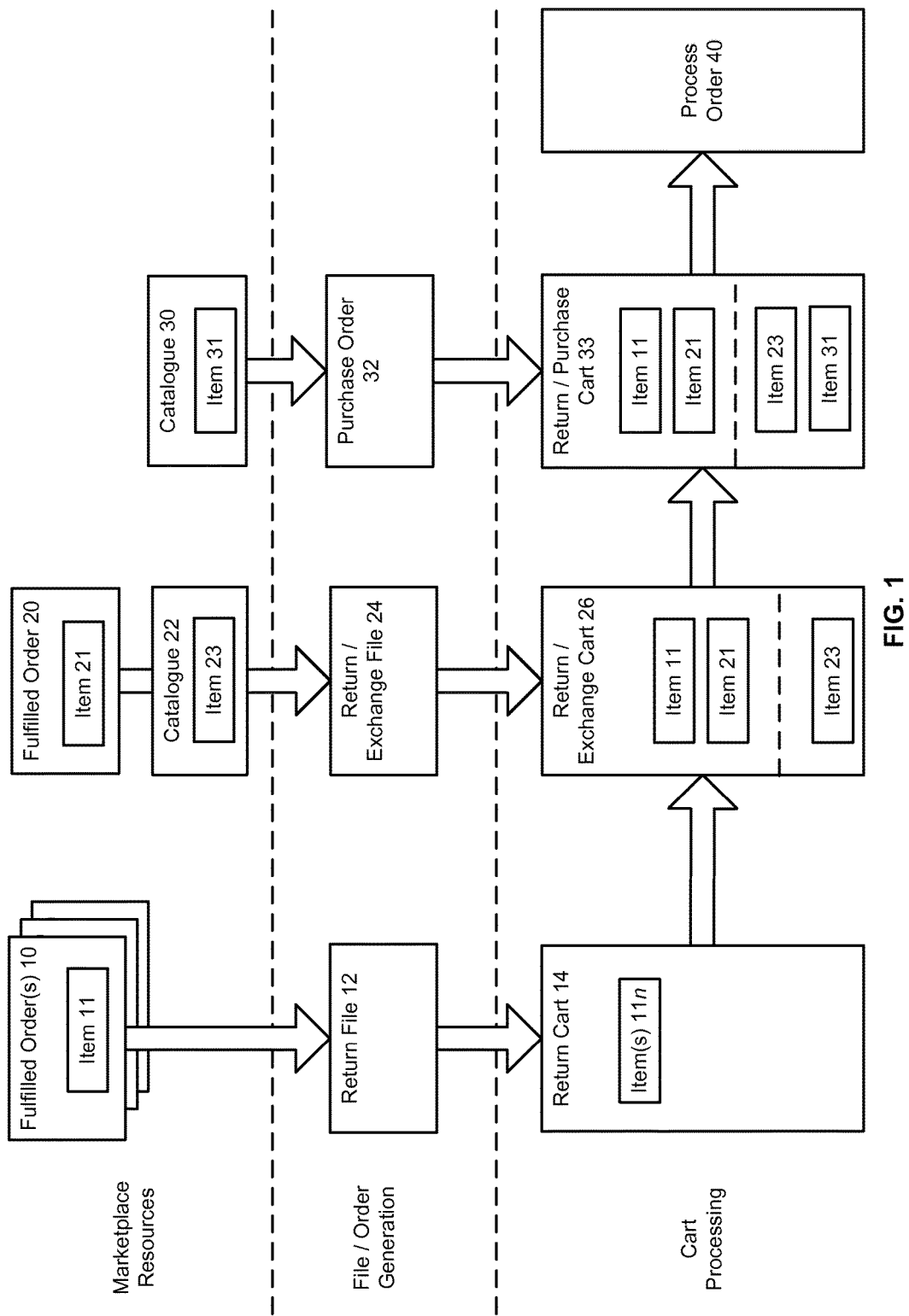
FIG. 1 illustrates an example environment for implementing a combined return service according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As described herein, an electronic marketplace, or other website, may be configured to support customer returns in various ways. For example, a "return cart" may be provided that allows the user to combine items, purchased in different transactions, in a single return. In some cases, the user may be able to browse a purchase history including several different orders, and select items from different orders to add to the return cart. The electronic marketplace may process the combined returns as a single transaction and provide at least one identifier that is common to all the items in the combined return, such as a return number, a shipping number/label, etc. In some examples, the return cart may be persistent and/or associated with a user account, thereby allowing it to be accessible at different times and/or from different devices. A return cart may also be combined with a "shopping cart," which allows the customer to purchase, exchange and/or return items in a single transaction.

In some examples, the return and/or shopping cart may be provided to the user in a user interface or return window that may be independent from a browsing window for the browsing session. The user interface or return window may be configured to remain active regardless of whether the browsing window for the browsing session is closed.

An electronic marketplace may be provided including a data store (sometimes referred to as an "electronic catalog") with user information and/or listings for items available for sale. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system. The electronic marketplace may be configured to provide browsing sessions for users, and to serve content to the users including the display of interactive product listings with various options such as size, color, pattern, model(s), etc. In one example, a user may be viewing digital content (e.g., information objects with associated metadata, links, etc.) using a third-party browser of a user device. In other examples, the user may be viewing items in an electronic catalog using an application that is specifically configured for that electronic catalog. Other means of network-based browsing, shopping, etc. are also envisioned.

In some examples, a web service such as a website, a virtual storefront, a Webstore, etc., may be provided as part of the electronic marketplace, and may be managed by one or more service provider computers (e.g., servers) that host electronic content in the form of, for example, the electronic catalog, with or without associated purchase and billing functionality. The service provider may act independently, or may serve various merchants or tenants. Customers may access the web service to search, view, review, discuss, order, stream and/or purchase items (e.g., physical items or services) from the web service.

Some or all of the processes described herein, or variations and/or combinations thereof, may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a high-level illustration of an exemplary return cart processing, including features related to accessing marketplace resources, such as historical orders and catalogues, and related file and order generation. Each operation represented therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

As shown in FIG. 1, one or more previously fulfilled orders 10 may be stored, for example in a database that is managed in an overall architecture of electronic marketplace resources. The fulfilled order(s) 10 may include at least one item 11 that was purchased by an associated user as part of the order(s) 10, and the user may access the order(s) 10 as part of a request to return any number of items 11n to the seller. Based on the user's request, a return file 12 may be generated as part of a return processing that generates, or modifies, a return cart 14 to include any number of items 11n, which may be from the same, or different, order(s) 10. As used herein, a "cart" should be generally understood as a software tool or set of tools, typically on a web server and/or client application, that allow users to select items for purchase, return, and/or exchange, that typically presents a representation (textual and/or graphical) of the items to the user, and that includes some executable instructions (e.g., embedded as icons, or the like) for initiating the purchase, return, and/or exchange of the items.

The return cart 14 (and modifications thereof) may be persistent, such that the user can access it at different times and/or from different computing devices, e.g., via its association with the user's account. For example, when a user logs on, and is authenticated, to a website, or other application, that is configured to interact with the electronic marketplace resources, the return cart 14 may be presented or made accessible to the user, as discussed further herein.

In this regard, the user may browse another previously fulfilled order 20 including at least one item 21 that the user also wants to return. The order 20 may represent a separate transaction than order 10, e.g., orders that were placed, paid for, and/or completed separately from each other. In this instance, a determination may be made, or the user may request, a replacement item, e.g., by browsing or otherwise accessing, catalogue 22. Item 23 is determined to be, or selected by the user as, a replacement for item 21 (and/or item 11, etc.). This may include, for example, the user selecting a different size or color of item 21, the different size or color corresponding to item 23. Based on the request to return item 21 and the determination/selection of item 23 as a replacement, a return/exchange file 24 may be generated including information necessary to update return cart 14 accordingly. By processing return/exchange file 24, the return cart 14 may be modified to add item 21 as a return, and add item 23 as a replacement to be delivered to the user, resulting in return/exchange cart 26.

The user may also browse catalogue 30 (which may be the same as, or different than, catalogue 22) including at least one item 31 that the user wants to purchase. Based on a request to purchase item 31, a purchase order 32 may be generated including information necessary to update return/ exchange cart 26 accordingly. By processing purchase order 32, the return/exchange cart 26 may be modified to add item 31 as an additional purchase, resulting in return/purchase cart 33. It should be noted that the number and sequence of events is not limiting and is merely a representation of the adaptability of processing techniques described herein. As discussed further below, it is equally possible to browse various fulfilled orders and add any number of items to a return cart (with or without designating exchange items), and/or to begin the process with generating, or using an existing, purchase cart that may be modified to include returns, exchanges, etc. In any event, the user may select to process the operations included in any of the return cart 14, return/exchange cart 26, return/purchase cart 33, or the like, at any point in the process by proceeding to process order 40. In some examples, processing the order 40 may include processing all of the returns, exchanges and/or purchases currently in the cart as a single transaction.

Figure 2:
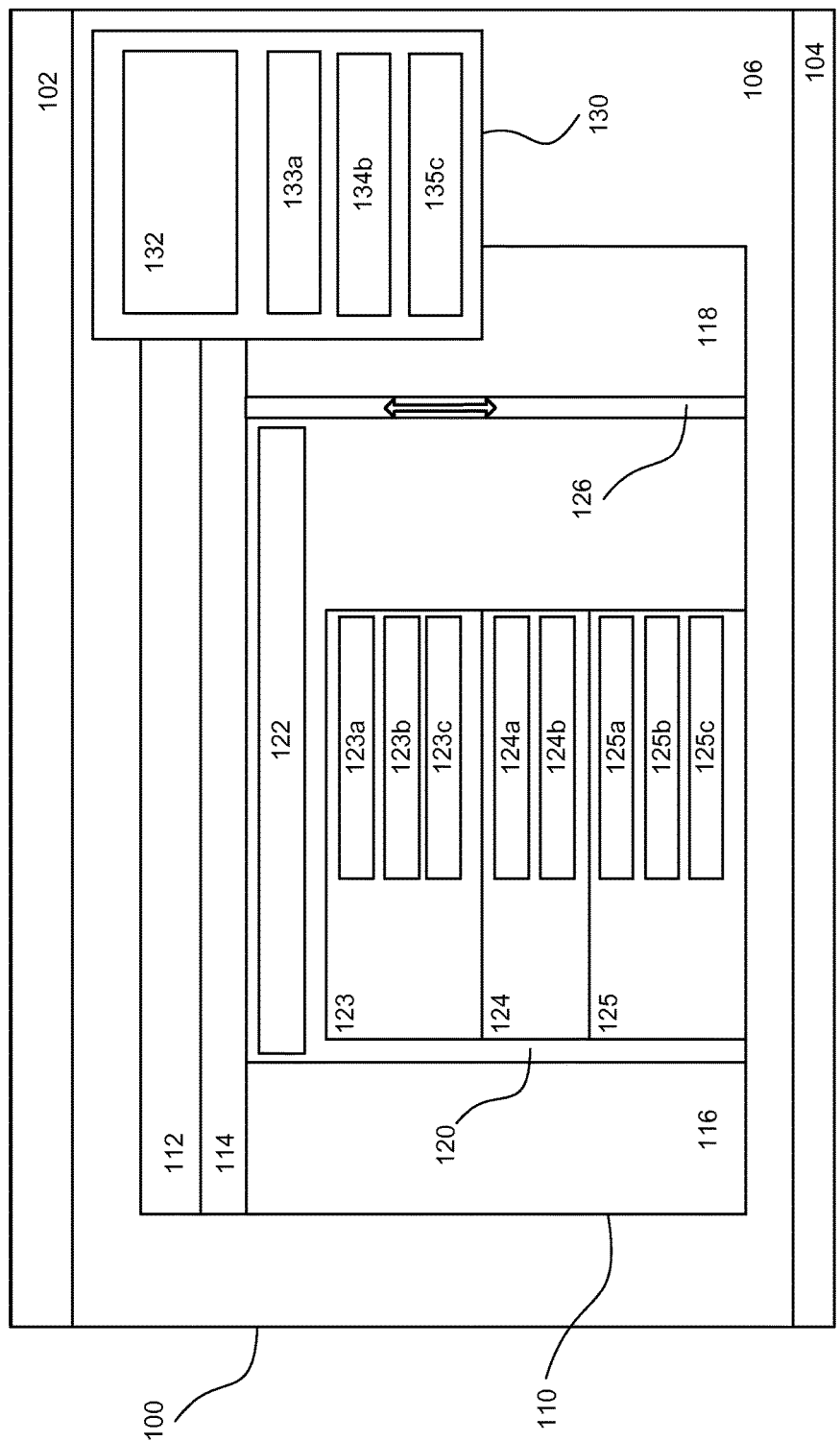
FIG. 2 illustrates an example graphical user interface (GUI) for presenting a return cart, according to at least one example.
Figure 4:
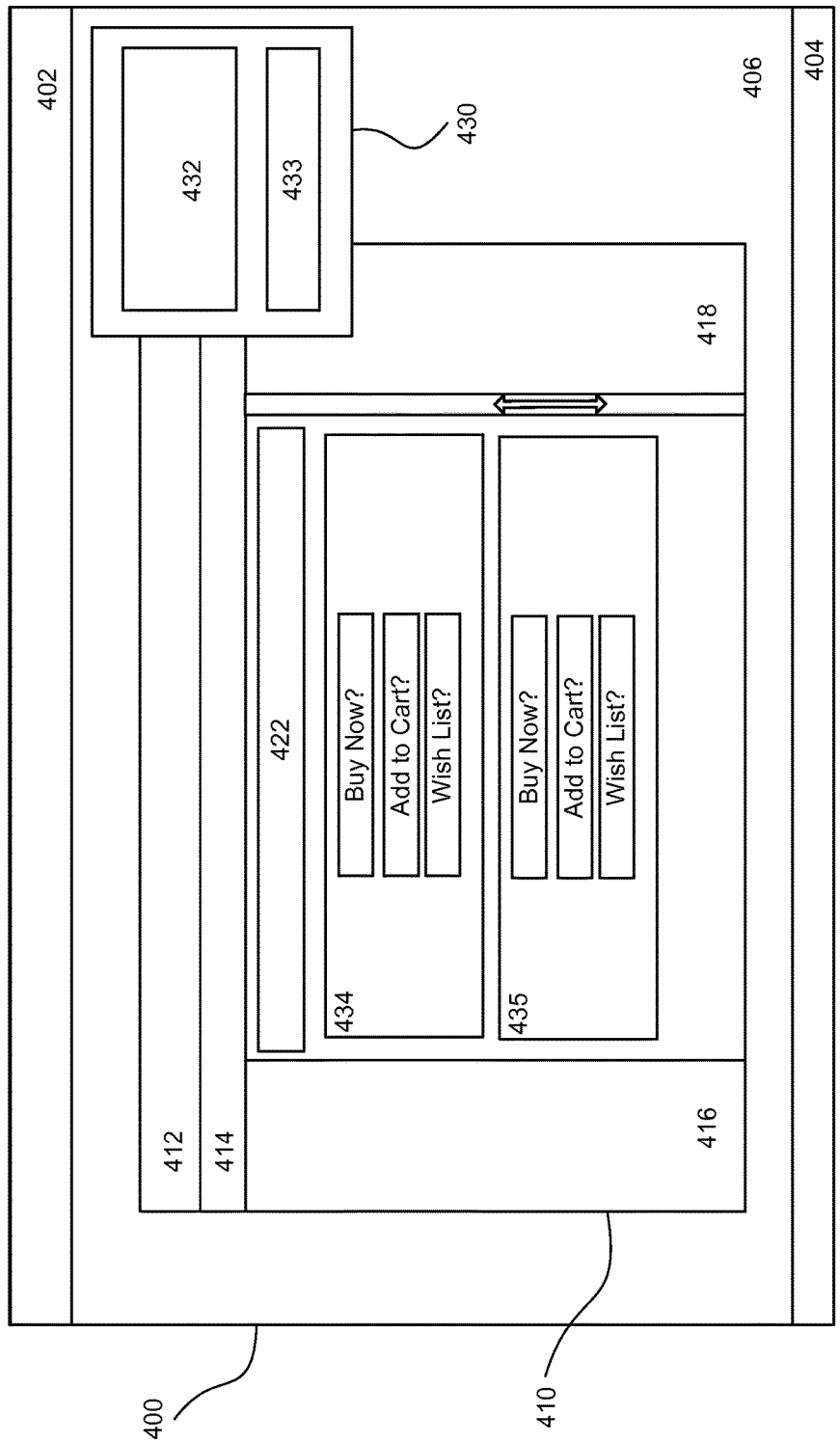
FIG. 4 illustrates another example GUI for presenting a combined purchase and return cart, according to at least one other example.
Figure 5:
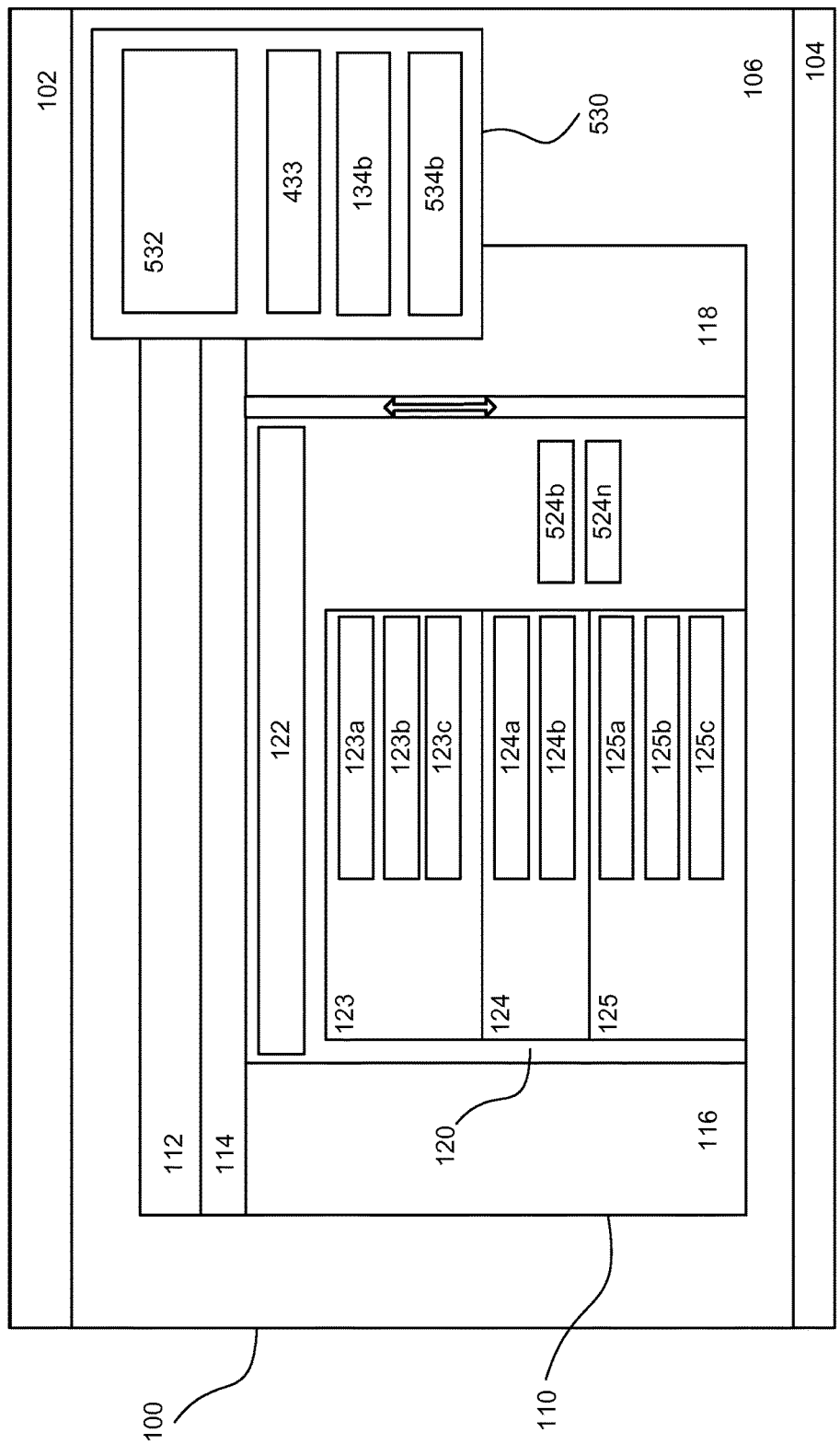
FIG. 5 illustrates another example GUI for presenting a combined purchase and return cart, according to at least one other example.

FIGS. 2, 4 and 5 illustrate various aspects of exemplary GUIs including return carts, via which users may be allowed to process returns in an electronic marketplace, according to aspects of the disclosure. The elements depicted as included in these GUIs are not intended to be limiting and it is to be understood that GUIs can take on many different forms, e.g., in the context of web browsers, or other applications, running on user computing devices and the like.

As shown in FIG. 2, a GUI 100 may include various command bars 102, 104 and a work area 106. Displayed in the work area is a web page 110, which may be presented based on information received from a service provider, as discussed further herein. In this instance, web page 110 includes its own command bars 112, 114, and sidebars 116, 118 which may include functionality tailored to the web page's intended purpose, e.g. various e-commerce or other functionality. In some examples, the application window 110 (and other application windows described herein) may be a browser, an e-reader application, a game, a multimedia player, a social media application, or other first party or third party application. As used herein, first party applications should be understood as those applications that are provided by default with a device when delivered to the user and/or developed by an entity that also provides the device and/or the operating system of the device, whereas, third party applications are typically those that the user adds to a device that are developed by third-parties other than the entity that also provides the device and/or the operating system of the device (e.g., by downloading, sideloading, etc.).

In the browsing area 120, there may be a search bar 122 for entering searches to the web page 110, and object areas 123-125, which may include, for example, information about orders associated with a user account, and/or returned in response to a search entered in search bar 122. For example, the browsing area 120 may be configured as an area for browsing the user's previous orders, and may present an order history include a list of orders 123-125 that the user can scroll through, e.g. using scroll bar 126. Each of the orders 123-125 may include information about items included in the order, as well as pricing, shipping date, and any other information that may be relevant to such orders. In the example shown in FIG. 2, the order 123 has item information 123a-c about different items that were purchased in order 123, the order 124 has item information 124a-b about different items that were purchased in order 124, and the order 125 has item information 125a-c about different items that were purchased in order 125. In some examples, each of orders 123-125 may represent different transactions, e.g. separate orders that were processed, paid and/or shipped separately.

Item information areas 123a-c, 124a-b, 125a-c, and the like, may be configured as, or include, user-selectable icons that automatically populate a return window 130 with the corresponding item. For example, based on a user selection of an icon in area 123a, the corresponding item may be listed in return window 130 in area 133a, based on a user selection of an icon in area 124b, the corresponding item may be listed in return window 130 in area 134b, and based on a user selection of an icon in area 125c, the corresponding item may be listed in return window 130 in area 135c, etc. The object areas 123-125 may be loaded with sufficient information to automatically populate the return window 130, or they may include pointers or the like, that allow for the necessary information to be retrieved based on the user selection. Item listings, customer orders, and exemplary details that may be included therein are discussed further below, e.g., with reference to FIG. 3.

Return window 130 may be generated as a separate object, e.g. a persistent window on GUI 100, or work area 106, or may be integral with a browser, e.g., displaying web page 110. As discussed herein, a return window like window 130 may be generated and/or modified based on user selection of appropriate information objects, like icons in areas 123-125, etc. As part of generating and/or modifying window 130, a command and/or information area 132 may be configured to include, for example, execution icons to command execution/processing of returns listed in return window 130, shipping options and/or information for a combined return of items listed in window 130, return price and/or processing details regarding items listed in window 130, etc.

It should also be understood that, although depicted in the context of a web browser, systems like those depicted in FIG. 2 may also be configured, for example, as applications, plug-ins, flash or other dynamic objects, pop-ups, and the like.

The browser, or other applications, such as shown in FIG. 2 may be configured to present and/or interact with order information maintained on a back-end system such as one or more servers, and associated hardware and software making up an electronic marketplace or other web service. In some examples, this may include interacting with and/or obtaining information from purchase orders such as shown in FIG. 3.

Figure 3:
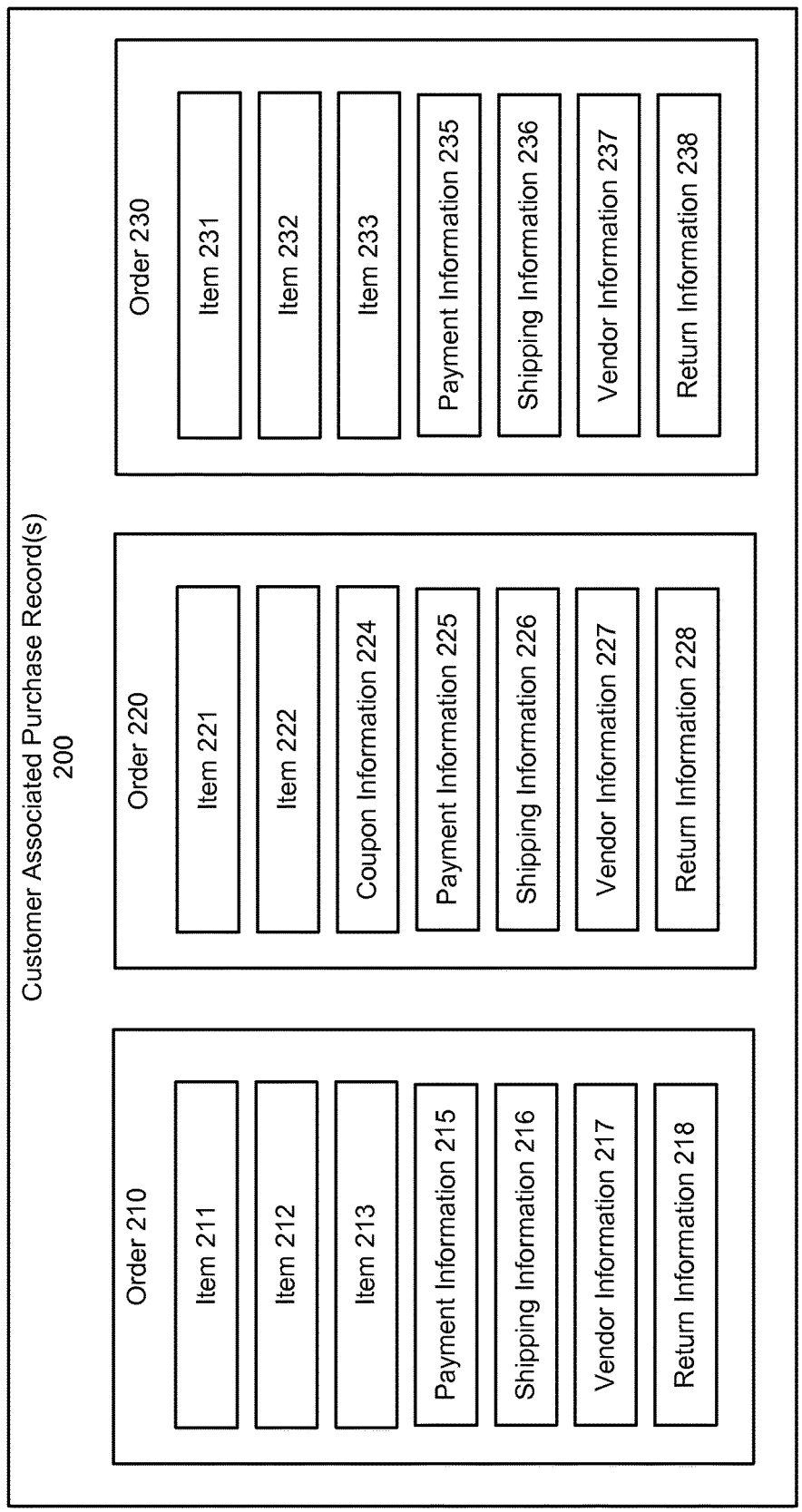
FIG. 3 illustrates an example of various purchase orders, associated with a user account, that may be accessed in processing a combined return transaction according to at least one other example.

As shown in FIG. 3, a plurality of orders 210, 220, 230, etc. may be stored in a database and associated with a user account. Such associations may be made according to various database techniques known in the art, such as by including user account information in particular fields, lookup tables, storing separate transaction records as one or more combined files, etc. In the example shown in FIG. 3, customer associated purchase records 200 include orders 210, 220, 230, although any number are possible. Each of orders 210, 220, 230 contains at least some information that is unique to that order, e.g., particular items 211-213, 221-222, 231-233, coupon and/or promotion information 224, as well as information that may be more particularized for that specific order, e.g. payment information 215, 225, 235 (which may include specific amounts and type of payment received), shipping information 216, 226, 236 (which may include specific shipping costs based on weight, shipping location, delivery location, etc.) and/or return information 218, 228, 238 (which may include specific return policies for a given type of goods, a particular manufacturer, vendor, etc.). Each of orders 210, 220, 230 may also contain vendor information 217, 227, 237, which may include vendor identification, shipping, return policy, payment methods, or other information related to one or more vendors associated with the particular order.

It is noted that, while some of the information elements shown in FIG. 3 are shown in a unitary manner for ease of depiction, there may certainly be item-specific information in the context of multi-item orders, such as when different items have different return parameters, etc.

As discussed herein, various server-side and/or client-side applications may access the order information included in any of orders 210, 220, 230, or other related records and/or fields, as part of a process of selecting previously purchased items for return, obtaining information necessary to determine relevant return parameters, refund information, return shipping options, costs, etc. For example, as part of browsing a user's purchase history, like shown in FIG. 3, the system may access the customer associated purchase records 200, and item information for each of orders 210, 220, 230, etc. This information may be used to display a list of selectable areas, e.g., 123a-c, 124a-b, 125a-c, and the like, corresponding to previously purchased items. Upon selection of one or more of such items, the system may further access information that is relevant to calculating return parameters and/or options such as those that may be displayed in area 132. For example, as various items are added to return window 130, a calculated shipping cost, refund amount and/or options, etc., may be presented in area 132.

It is also noted that information such as that included in orders 210, 220, 230 may be used to determine, for example, whether a return is possible for a selected item, whether combined return shipping is possible and/or practicable, and/or whether additional acknowledgments, waivers, payment, etc. may be required.

FIG. 4 shows additional details regarding an exemplary display and GUI that may be used to integrate purchase functionality with return functionality, such as described above. The display 400 may be included in any number of electronic devices such as a smartphone, a tablet computer, a laptop computer, a desktop computer, a network-enabled television, an electronic book reader, a gaming device, a wearable computing device, etc.

In the example shown in FIG. 4, display 400 includes tool/command bars 402, 404, and a work area 406 including an application window 410, which may be a modified version of the application window 110 shown in FIG. 2. For example, a user may transition between one presentation tailored to support returns, as in FIG. 2, and another presentation tailored to provide purchase, return and/or exchange options, as in FIG. 4.

Within application window 410, tool bars 412, 414, 416 and 418 (e.g., including commands for transitioning between various application states, functions, etc.) may be present, along with a search bar 422 and application content, in this case a display of item information 434 and 435 reflecting results of a search and/or suggested replacement items for an item that has already been placed in a return cart, such as shown in FIG. 2.

Within item information areas 434 and 435 are user-selectable icons (e.g. "Buy Now?", "Add to Cart?", and "Wish List?") related to browsing, purchasing, and/or selecting items for exchange, from listings in an electronic catalogue associated with an electronic marketplace.

If the "Add to Cart?" icon is selected by the user, or otherwise activated, purchase window 430 may be launched and/or configured to include a corresponding item listing 433 and purchase information 432 (such as price, tax, shipping, etc.). On the contrary, selection of the "Buy Now?" icon may initiate a more streamlined or expedited purchasing process, that may be configured, for example, to bypass any existing purchase and/or return carts that have been generated. Accordingly, it may be possible for the user to make selected purchases while still maintaining the persistent return cart, and the like.

As noted previously, the user may transition from the GUI shown in FIG. 4 to another GUI, e.g. back to a return interface as shown in FIG. 2. Additional details regarding integration of the purchase window 430 and the return window 130 are shown in FIG. 5.

As shown in FIG. 5, the user may transition from GUI 400 back to GUI 100. As in FIG. 2, the browsing area 120 includes object areas 123-125 including the information about orders associated with the user account. In this instance, the purchase window 430 from FIG. 4 has been modified to return/purchase window 530 including not only the item 433 that is being purchased, but also item 134b that is being returned. Additionally, based on the user's selection of item 124b (corresponding to item 134b) in area 124, a number of exchange options 524b-524n are presented to the user. The generation and presentation of exchange options may take many forms, including client-driven options (such as when the user indicates that a different size or color is desired), as well as automated suggestions, which may be determined based on user feedback about the item being returned, similar products, other user reviews, etc. In this case, the system responds to the user selecting item 524b as a replacement for item 124b/134b and updates return/purchase window 530 to include replacement item 534b (corresponding to item 524b).

Return/purchase window 530 may also be updated to include combined return or purchase information 532, which may include, for example, an updated shipping information for return of item 134b and/or delivery of items 433 and 534b, updated pricing reflecting the price of item 433 and any adjustment that may be necessary based on replacement item 534b, etc. Return/purchase window 530 may be generated as a separate object, e.g. a persistent window on GUI 100, or work area 106, or may be integral with a browser, e.g., displaying web page 110. As discussed herein, a return window like window 130 may be generated and/or modified based on user selection of appropriate information objects, like icons in areas 123-125, etc. As part of generating and/or modifying window 130, a command and/or information area 132 may be configured to include, for example, execution icons to command execution/processing of returns listed in return window 130, shipping options and/or information for a combined return of items listed in window 130, return price and/or processing details regarding items listed in window 130, etc.

It should be noted that any of the application work areas depicted in FIGS. 2, 4 and 5 may be configured with embedded functionality that allows a user to view, compare, preview, purchase, return, and/or exchange an item as discussed herein.

Figure 6:
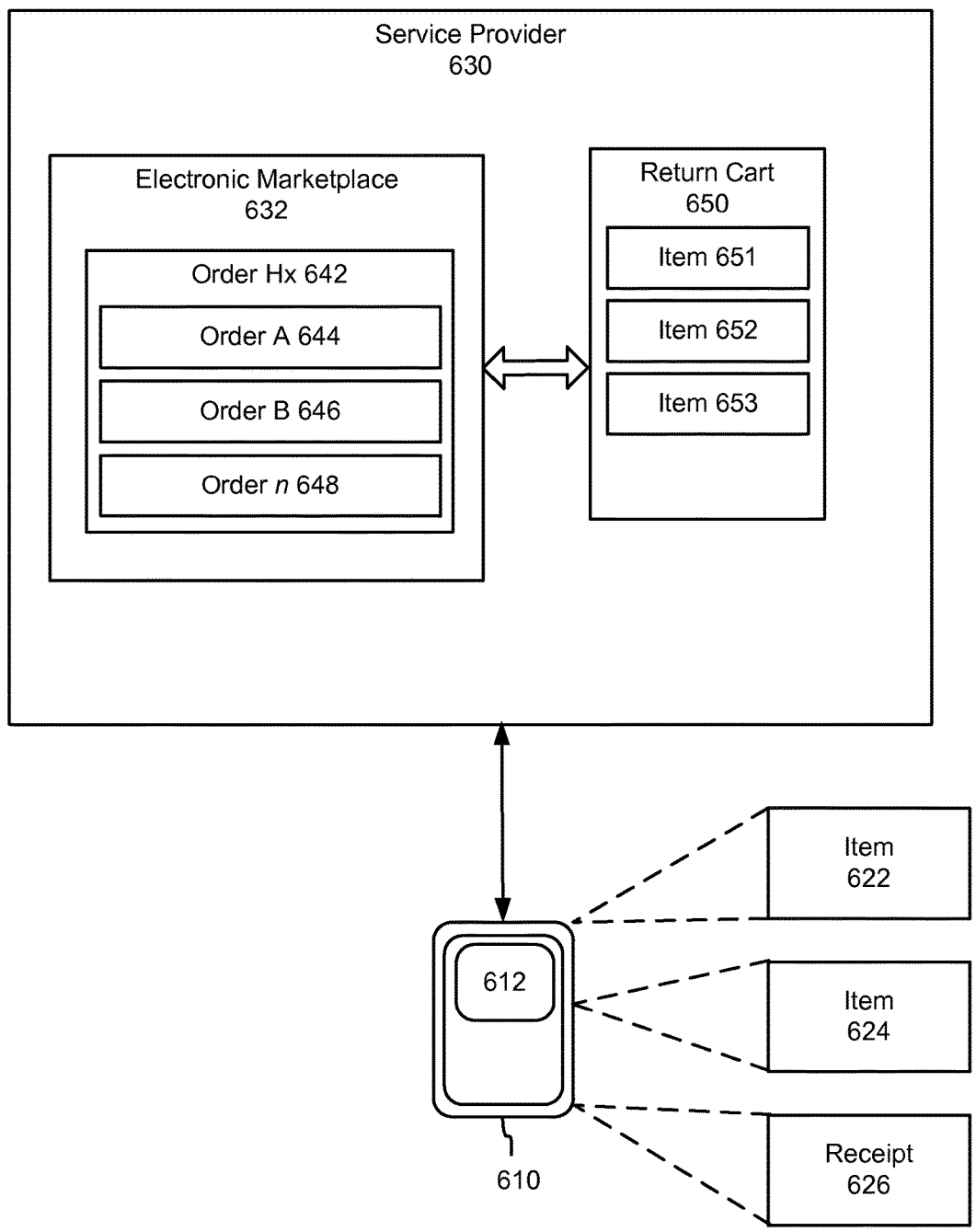
FIG. 6 illustrates another example environment for implementing a combined return service according to at least one example.

As shown in FIG. 6, a network environment in which certain examples may be implemented may include a client computing device 610 in communication with a service provider 630, e.g. over the Internet, or other local area network (LAN), wide-area network (WAN), a virtual private network (VPN), intranet, extranet, public switched telephone network, infrared network, wireless network and any combination thereof. Service provider 630 may provide an electronic marketplace 632, e.g., using one or more service provider computers (e.g., servers) that host electronic content in the form of an electronic catalog, and that store records of past transactions, such as in an order history 642. The records in order history 642 may take many forms, and may be associated with particular customers, vendors, fulfillments centers, etc.

It is noted that the service provider 630 may act independently, or may serve various merchants or tenants. Customers may access the electronic marketplace 632 via various types of user devices to search, view, review, discuss, order, stream, purchase, return and/or exchange items (e.g., physical items or services) from the service provider 630 or other merchants. In this case, the client device 610 may be used to browse item listings via an electronic catalogue, e.g., using a standard web browser, a specialized application, etc.

Client device 610 may be any type of computing device such as, but not limited to, a mobile phone, a smart phone, a personal digital assistant (PDA), a laptop computer, a desktop computer, a thin-client device, a tablet PC, an electronic book (e-book) reader, a wearable computing device, a gaming system, etc. The client device 610 is depicted as displaying a return application 612, and including at least an image capture device or scanner that is capable of imaging or scanning items 622, 624, and/or receipt 626, or bar codes or other identifiers included, for example, on packaging of the items 622, 624 or the receipt 626. In one example, a bar code from item 622 may be scanned by the client device 610 and transmitted to service provider 630. The service provider 630 may compare the bar code to previous orders from order history 642 to determine an item that the user wants to add to a return cart 650 and/or to determine an order, such as orders 644, 646, 648 that the user may want to view in order to select an item to return.

For example, if an item bar code is scanned, the system may identify any orders associated with the user account that include the scanned item. If no corresponding orders are found, an error message may be returned via application 612. If two or more orders are found that include the item, the system may ask the user to select the appropriate order via application 612, e.g. from a list, based on order date, shipping address, etc. Selecting the correct order may be significant, for example, if similar items were sold for different prices on different dates, if different shipping addresses or rates applied, etc. If only one corresponding order is found, it can be scanned to retrieve the necessary information such as the purchase price, payment method, etc.

In other examples, a bar code or other identifier may definitively identify an order from which the user is interested in selecting an item for return. In that case, the system may provide the user with a copy of the order via application 612 from which to select the item that is being returned, or if the order only includes one item, that item may be added to the return cart 650.

The scanning process, and/or manual selection, may be repeated any number of times via application 612 to add additional items 651-653 to return cart 650.

Figure 7:
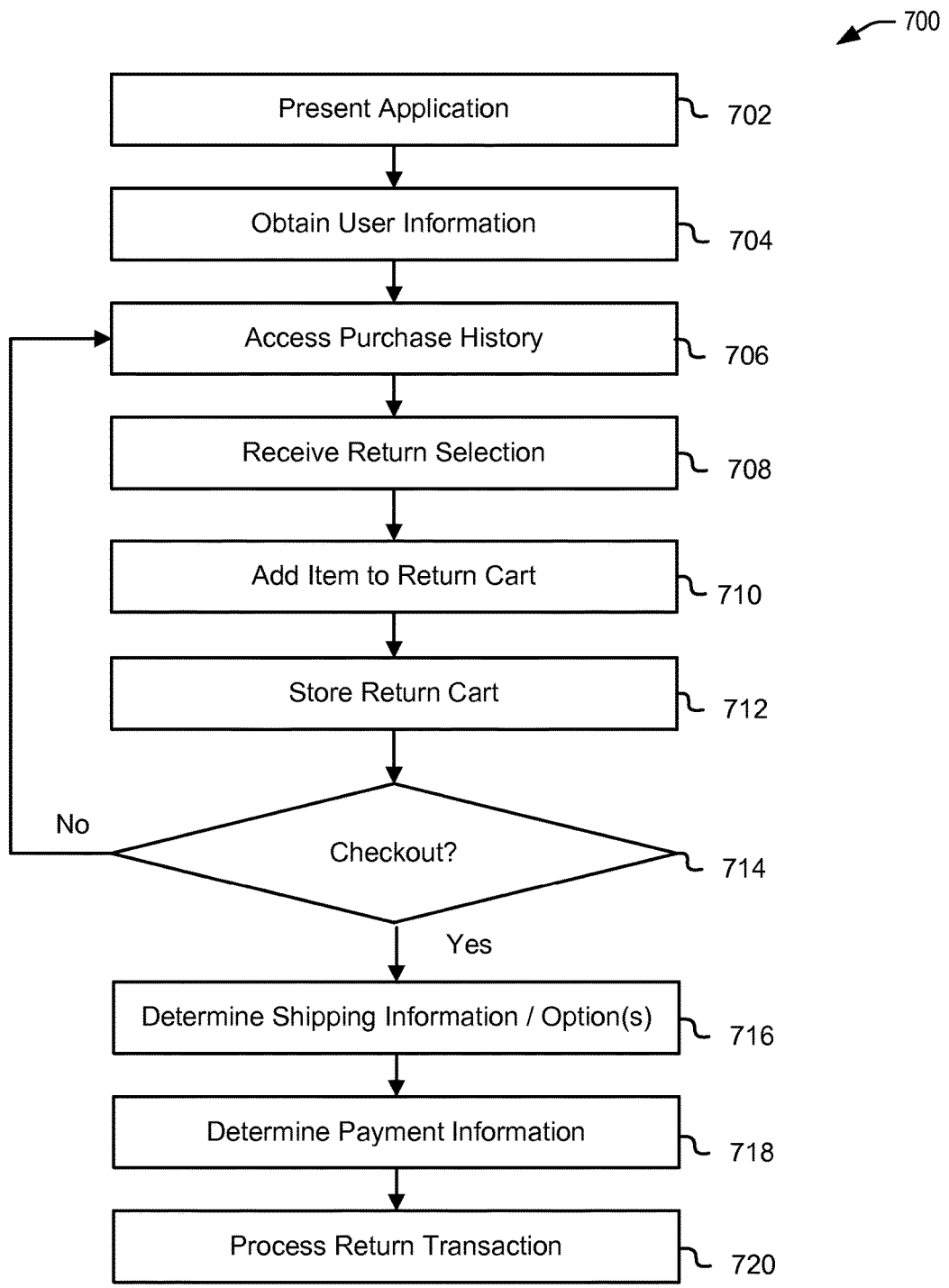
FIG. 7 is a flow diagram depicting an exemplary process for providing combined return services, according to at least one other example.
Figure 8:
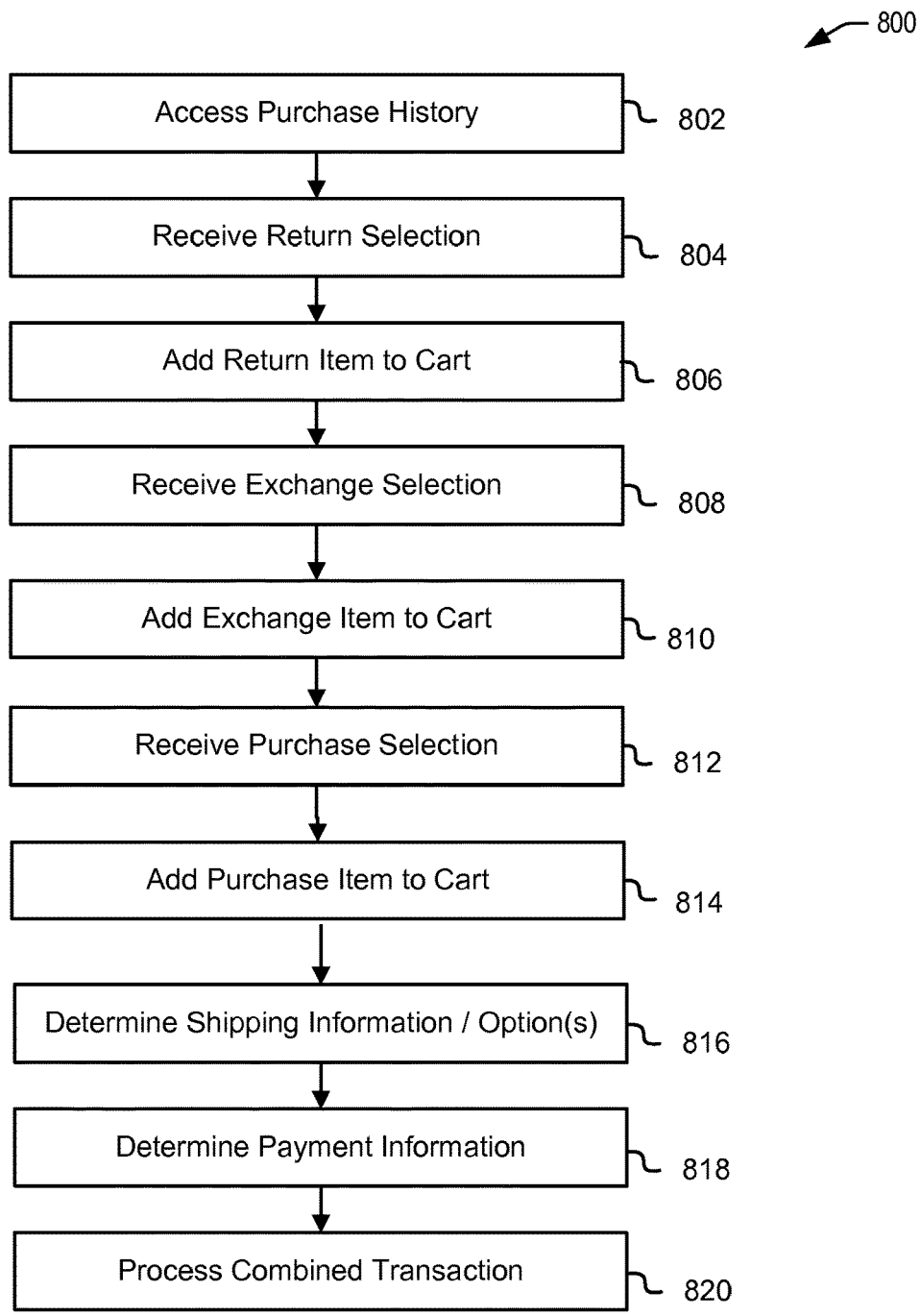
FIG. 8 is a flow diagram depicting an exemplary process for providing combined return services including returns, exchanges, and/or purchases, according to at least one other example.

FIGS. 7 and 8 depict flow diagrams of item return processes according to other examples. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

FIG. 7 is a flow diagram depicting an example process 700 for providing returns from multiple orders as a single transaction. Process 700 may begin with 702 in which a first application is presented on a client computing device, such as application 110 shown in FIG. 2. In some examples, the first application may be a browser, an electronic book reader application, a game, a multimedia player, or a social media application. Presenting the first application may include initiating a browsing session, e.g., responsive to a user requesting access to an e-commerce site, user account history, or other network resource. This may involve, for example, a service provider receiving a user request via a network, such as the Internet, and replying to the requesting user with instructions for providing an interactive network page.

The process may optionally continue with 704, in which information related to the requesting user may be obtained. This may include authenticating the user via known techniques such as login and password information, tokens, device-based authentication, biometrics, etc.

The process may continue with 706, in which purchase history associated with the requesting user may be accessed. This may include, for example, the user associated purchase records such as shown in FIGS. 2 and 3.

The process may continue with 708, in which a user's selection of an item to be returned may be received. The selection may be obtained, for example, via a user's interaction with a web page or application such as shown in FIG. 2, e.g. by selecting an icon associated with an item from a particular order.

The process may continue with 710, in which an information object representing the item to be returned is added to the return cart. This may include generating the return cart or modifying an existing return cart to include such information. Information specific to the order from which the item was selected may also be associated with the information object. This can take many forms, but may generally be understood as associating information that may be useful in processing a return, e.g., the specific purchase price, the payment method used, whether the user applied any coupons or promotional codes, etc.

The process may optionally continue with 712, in which a representation of the return cart may be stored. In some examples, this may be done on an electronic marketplace server, such that the user can access the return cart at a later time and/or from a different device, assuming the appropriate user authentication is performed.

The process may continue with 714, in which a determination may be made regarding whether the user desires to "check out," or process the returns in the return cart. This may include receiving an affirmative command from the user, e.g., selecting a "checkout" icon, or may include prompting or reminding the user about a pending return that has not been processed. In some examples, reminders may be generated and sent to an address associated with the user account, e.g. an email address, a messaging address, or a dynamic address generated during a communication session associated with the user account. Reminders as discussed herein may generally include an indication that an existing return cart has not been processed, and/or an indication that an item already processed for return has not been received.

If it is determined that the user is not ready to check out, the process may return to 706, in which the user may access additional purchase history information, e.g. different orders, different items from the same order, etc. and add additional items to the return cart.

If it is determined that the user is ready to check out, the process may continue with 716, in which shipping information about the item(s) to be returned is obtained. This may include, for example, determining weight for the item, a receiving location for the item to be returned, a location from which the item was originally shipped, etc. Shipping options may also be obtained and/or determined in 716. For example, depending on the address from which, or to which, the item is being returned, different shipping carriers or methods may be preferred and/or available. Information specific to the item(s) being returned, or the user's preferences, may also dictate or suggest preferred shipping options, such as weight restrictions on certain shipping options, a user's preferred shipping option, an agreement to use corresponding shipment options for delivery and returns, etc.

The process may continue with 718, in which payment information may be determined. This may include, for example, determining the total refund amount that will be due to the customer upon receipt of the returned item(s), determining the appropriate repayment type (e.g., credit card, debit card, store/vendor credit, gift card, etc.). In some cases, items from different orders may have different repayment options associated with them. In such cases, the system may assign two or more different repayment methods for a single return transaction. Step 718 may also include determining whether any additional payment is required, e.g. for providing a pre-paid return shipping label, for upgrading an item being returned to another item, for adding a new item for purchase to be combined with the return, etc.

The process may continue with 720, in which a combined return transaction may be processed. In some examples, this may include processing a return of multiple items from different purchase orders, processing combined return(s) and exchange(s), and/or processing combined return(s), exchange(s) and/or purchase(s). If there is more than one item to be returned together, this may also include determining if the items can be shipped together, e.g. in one package, whether the items can be returned to the same receiving location, etc. If the items can be returned in the same package, instructions for generating a single shipping label may be generated. If the items need to be shipped separately to the same or different receiving location(s), then instructions for generating multiple labels may be generated.

If there is more than one item to be returned together, 720 may also include generating a verification record for use by the electronic marketplace that indicates whether the items are expected to be returned together or separately. This record may be accessible by various return facilities that may be assigned to receive the returned items. In some examples, a single shipping label for combined shipping of the items may be generated based on first shipping information associated with a first item and second shipping information associated with a second item. This may take various factors into consideration, such as whether the items were originally shipped from different fulfillment facilities or merchants, and whether one of the original fulfillment facilities or merchants is better situated to receive the combined return shipment, whether a receiving facility is closer to the user, etc. It should be appreciated that, according to such features, a combined return shipment may result in one or more items being shipped differently than would have been indicated had the items been returned in separate shipments. As such, there are opportunities to provide cost savings and other efficiencies that would not otherwise be possible. One example may be that multiple items from different orders with a relatively low weight can be return shipped without exceeding a weight limit for certain shipment types. Cost savings associated with combined shipments can be updated in the persistent return cart, and allow a customer to, for example, build up to an optimal weight limit before processing their combined return.

Examples may also include monitoring the return as part of 720, e.g., tracking shipping progress of returned items, receiving confirmation that the items have been received at a receiving location associated with the electronic marketplace, etc. In some examples, a refund may be processed in association with the user account, or a replacement item may be shipped to an address associated with the user account based, at least in part, on such conformation(s). For example, it may be desirable to confirm receipt of the return, and/or confirm the condition of the returned item(s) before initiating a refund and/or replacement.

FIG. 8 is a flow diagram depicting an example process 800 for providing combined returns, exchanges, and/or purchases in a combined transaction. Process 800 may begin with 802, which may be similar to, and incorporate similar steps leading up to, 706 from FIG. 7 as described above. In 802, purchase history associated with a requesting user may be accessed. This may include, for example, the user associated purchase records such as shown in FIGS. 2 and 3.

The process may continue with 804, in which a user's selection of an item to be returned may be received. The selection may be obtained, for example, via a user's interaction with a web page or application such as shown in FIG. 2, e.g. by selecting an icon associated with an item from a particular order.

The process may continue with 806, in which an information object representing the item to be returned is added to the transaction cart. This may include generating the transaction cart or modifying an existing transaction cart to include such information. Information specific to the order from which the item was selected may also be associated with the information object. This can take many forms, but may generally be understood as associating information that may be useful in processing a return, e.g., the specific purchase price, the payment method used, whether the user applied any coupons or promotional codes, etc.

The process may continue with 808, in which a user's selection of an item to be exchanged for the item being returned may be received. The selection may be obtained, for example, via a user's interaction with a web page or application such as shown in FIG. 5, e.g. by selecting an icon associated with a replacement item that is suggested or otherwise found.

The process may continue with 810, in which an information object representing the replacement item is added to the transaction cart. Information specific to the replacement item may also be associated with the information object. This can take many forms, but may generally be understood as associating information that may be useful in providing the replacement item, e.g. the purchase price of the replacement item, fulfillment facilities that stock the replacement item, the shipping requirements for the replacement item, etc.

The process may continue with 812, in which a user's selection of an item to be purchased may be received. The selection may be obtained, for example, via a user's interaction with a web page or application such as shown in FIG. 4, e.g. by selecting an "Add to Cart" icon associated with an item to be purchased.

The process may continue with 814, in which an information object representing the item to be purchased is added to the transaction cart. Information specific to item to be purchased may also be associated with the information object. This can take many forms, similar to those typically used in adding items for purchase to virtual shopping carts.

It should be noted that, although not depicted as occurring at a particular step in the flow 800, a representation of the transaction cart may be stored at any time. In some examples, this may be done on an electronic marketplace server, such that the user can access the transaction cart at a later time and/or from a different device, assuming the appropriate user authentication is performed.

It may also be determined, after any of 806, 810, and/or 814, that the user is ready to check out, in which case the process may continue immediately with 816, in which shipping information about any of the item(s) to be returned, exchanged, and/or purchased may be obtained. This may include, for example, determining weight for an item, a receiving location for an item to be returned, a location from which the return item was originally shipped, etc. Shipping options may also be obtained and/or determined in 816. For example, depending on the address from which, or to which, the item is being returned, different shipping carriers or methods may be preferred and/or available. Information specific to the item(s) being returned, or the user's preferences, may also dictate or suggest preferred shipping options, such as weight restrictions on certain shipping options, a user's preferred shipping option, an agreement to use corresponding shipment options for delivery and returns, etc.

The process may continue with 818, in which payment information may be determined. This may include, for example, determining a total refund amount that will be due to the customer upon receipt of the returned item(s), determining the appropriate repayment type (e.g. credit card, debit card, store/vendor credit, gift card, etc.), calculating a total balance for the transaction based on the return, exchange, and/or purchase item(s), etc. Step 818 may include determining whether any additional payment is required, e.g. for providing a pre-paid return shipping label, for upgrading an item being returned to another item, for adding a new item for purchase to be combined with the return and/or exchange, etc.

The process may continue with 820, in which the combined transaction may be processed. In some examples, this may include processing a return of multiple items from different purchase orders, processing combined return(s) and exchange(s), and/or processing combined return(s), exchange(s) and/or purchase(s). If there is more than one item to be returned from, or shipped to, the customer together, this may also include determining if the items can be shipped together, e.g. in one package, whether the items can be returned to the same receiving location, whether the items can be shipped from the same fulfillment location or merchant, etc. If the items can be returned in the same package, instructions for generating a single shipping label may be generated. If the items need to be shipped separately to the same or different receiving location(s), then instructions for generating multiple labels may be generated.

In some examples, processing a combined transaction in 820 may include processing instructions for a delivery service or carrier service that is delivering a new and/or replacement item to also pick up an item that is being returned and/or exchanged. For example, a delivery service may be instructed to pick up one or more return items from an address to which one or more new and/or replacement items are to be delivered, and deliver the one or more return items to a single, or separate, return addresses. Instructions for generating the return label(s) for the return item(s) may be sent to the customer, allowing the customer to pack and label the return item(s), and/or to the delivery service, e.g., so the delivery service can prepare the return item(s).

Examples may also include monitoring the return as part of 820, e.g., tracking shipping progress of returned items, receiving confirmation that the items have been received at a receiving location associated with the electronic marketplace, etc. In some examples, a refund may be processed in association with the user account, or a replacement item may be shipped to an address associated with the user account based, at least in part, on such conformation(s). For example, it may be desirable to confirm receipt of the return, and/or confirm the condition of the returned item(s) before initiating a refund and/or replacement. It may also be an agreed upon term of the transaction that a returned item must be received before shipping a purchased or exchange item, e.g., if a refund for the returned item(s) is being applied to a purchase price of the purchased item(s) or exchange item(s).

Figure 9:
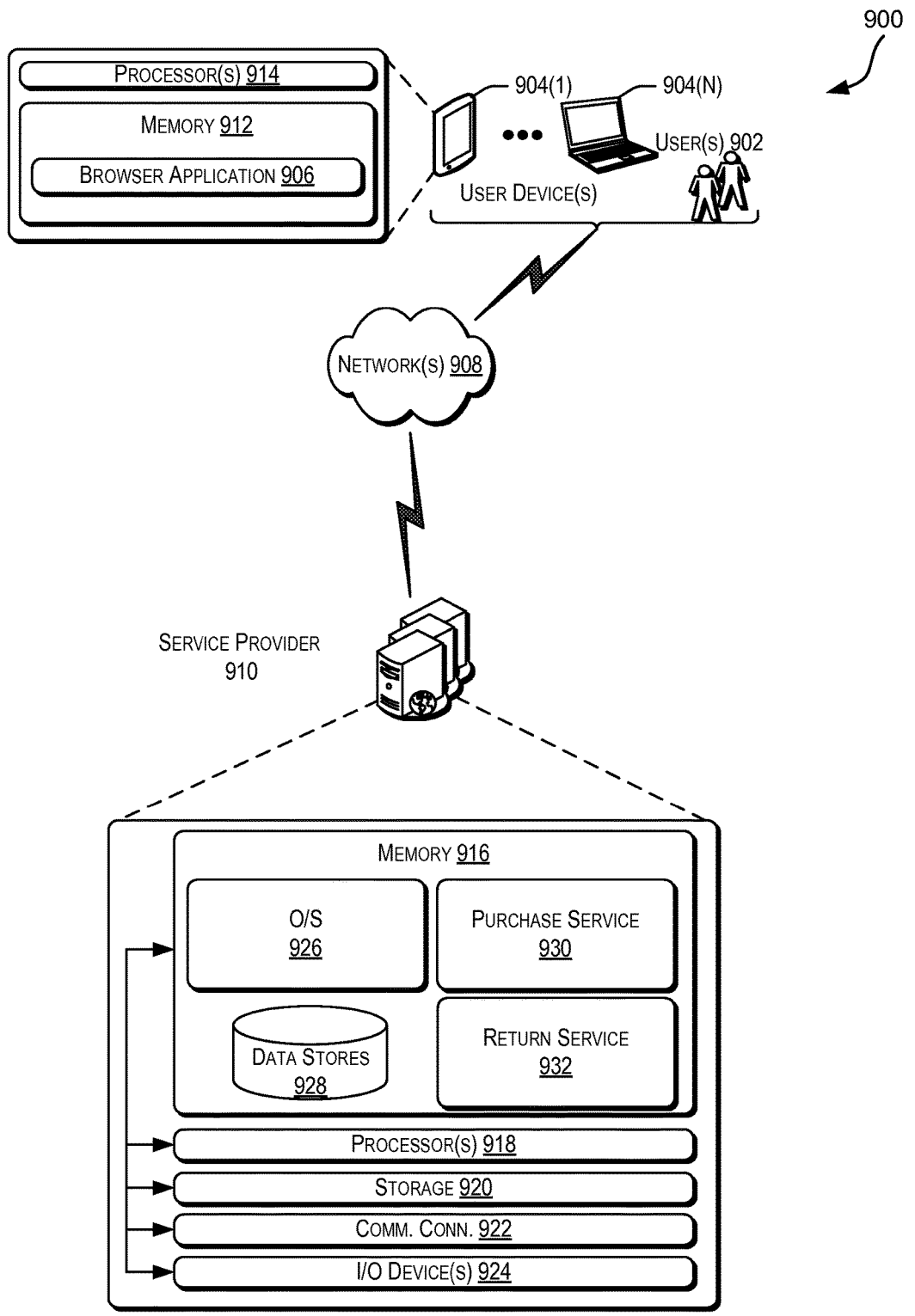
FIG. 9 illustrates another network environment in which various embodiments can be implemented.

FIG. 9 depicts an illustrative system or architecture 900 that depicts aspects of a return cart system applied in an electronic marketplace, as described herein. In architecture 900, one or more users 902 (i.e., electronic marketplace consumers or web browser users) may utilize user computing devices 904(1)-(N) (collectively, user devices 904) to access a browser application 906 (e.g., a web browser) or a user interface accessible through the browser application 906 via one or more networks 908.

In some aspects, the browser application 906 may be configured to receive, store, and/or display a website including search functionality (e.g., an electronic marketplace website), or other interface on a display screen of the user devices 904. In accordance with at least one embodiment, in addition to accessing the browser application 906 to view the electronic marketplace website, the users 902 may also utilize one or more native applications (e.g., a software application program) developed for use on a particular platform compatible with the user devices 904 to access and/or search the electronic marketplace or other web service such as social media sites including text, images, videos and/or audio data. The one or more service provider computers 910 may, in some examples, provide computing resources such as, but not limited to, data storage, data access, management, virtualization, cloud-based software solutions, electronic content performance management, and the like. The one or more service provider computers 910 may also be operable to provide web hosting, computer application development, and/or implementation platforms, combinations of the foregoing, or the like to the one or more users 902.

In some examples, the networks 908 may include any one or a combination of many different types of networks, such as cable networks, the Internet, wireless networks, cellular networks and other private and/or public networks. While the illustrated example represents the users 902 accessing the browser application 906 over the networks 908, the described techniques may equally apply in instances where the users 902 interact with the service provider computers 910 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The browser application 906 may allow the users 902 to interact with the service provider computers 910 (e.g., via the electronic marketplace website), such as to search for, browse for, purchase, return, and/or exchange items offered by the electronic marketplace, described herein. The one or more service provider computers 910, perhaps arranged in a cluster of servers or as a server farm, may host the electronic marketplace website and/or cloud-based software services. Other server architectures may also be used to host the electronic marketplace website and/or cloud-based software services. The browser application 906 may be capable of handling requests from many users 902 and serving, in response, various user interfaces that can be rendered at the user devices. In one example, the browser application 906 may be capable of receiving search queries from one or more users 902, and in response to the search queries, render network content (e.g., a web page) that includes hypertext information (e.g., information formatted in accordance with a hypertext markup language such as HTML) about an item listed (e.g., offered for sale) in an electronic marketplace system, as well as recommendations for other items and services as described herein. The browser application 906 can also provide any type of website that supports user interaction, including search engine sites. The described techniques may similarly be implemented outside of the browser application 906, such as with other applications running on the user devices 904.

The user devices 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 904 may be in communication with the service provider computers 910 via the networks 908, or via other network connections. Additionally, the user devices 904 may be part of the distributed system managed by, controlled by, or otherwise part of the service provider computers 910.

In one illustrative configuration, the user devices 904 may include at least one memory 912 and one or more processing units (or processor(s)) 914. The processor(s) 914 may be implemented as appropriate in hardware, computer-executable instructions, firmware, or combinations thereof. Computer-executable instruction or firmware implementations of the processor(s) 914 may include computer-executable or machine-executable instructions written in any suitable programming language to perform the various functions described.

The memory 912 may store program instructions that are loadable and executable on the processor(s) 914, as well as data generated during the execution of these programs. Depending on the configuration and type of user device 904, the memory 912 may be volatile (such as random access memory (RAM)) and/or non-volatile (such as read-only memory (ROM), flash memory, etc.). The user device 904 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 912 may include multiple different types of memory, such as static random access memory (SRAM), dynamic random access memory (DRAM), or ROM.

Turning to the contents of the memory 912 in more detail, the memory 912 may include an operating system and one or more application programs, modules, or services for implementing the features disclosed herein, such as via the browser application 906 or dedicated applications (e.g., smart phone applications, tablet applications, etc.). The browser application 906 may be configured to receive, store, and/or display a website (e.g., the electronic marketplace website), or other interface for interacting with the service provider computers 910. In accordance with at least one embodiment, the browser application 906 may receive search queries and item selections submitted by the users 902 and provide the search queries and item selections to the service provider computers 910, as well as select items for purchase, return, and/or exchange. Additionally, the memory 912 may store access credentials and/or other user information such as, but not limited to, user IDs, passwords, and/or other user information.

In some aspects, the service provider computers 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 910 may be in communication with the user devices 904 and/or other service providers via the networks 908, or via other network connections. The service provider computers 910 may include one or more servers, perhaps arranged in a cluster, as a server farm, or as individual servers as part of an integrated, distributed computing environment.

In one illustrative configuration, the service provider computers 910 may include at least one memory 916 and one or more processing units (or processor(s)) 918. The processor(s) 918 may be implemented as appropriate in hardware, computer-executable instructions, firmware, or combinations thereof. Computer-executable instruction or firmware implementations of the processor(s) 918 may include computer-executable or machine-executable instructions written in any suitable programming language to perform the various functions described.

The memory 916 may store program instructions that are loadable and executable on the processor(s) 918, as well as data generated during the execution of these programs. Depending on the configuration and type of service provider computers 910, the memory 916 may be volatile (such as RAM) and/or non-volatile (such as ROM, flash memory, etc.). The service provider computers 910 or servers may also include additional storage 920, which may include removable storage and/or non-removable storage. The additional storage 920 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 916 may include multiple different types of memory, such as SRAM, DRAM, or ROM.

The memory 916, the additional storage 920, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 916 and the additional storage 920 are all examples of computer storage media. Additional types of computer storage media that may be present in the service provider computers 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 910. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 910 may also contain communications connection(s) 922 that allow the service provider computers 910 to communicate with a stored database, another computing device or server, user terminals and/or other devices on the networks 908. The service provider computers 910 may also include I/O device(s) 924, such as a keyboard, a mouse, a pen, a voice input device, a touch input device, a display, speakers, a printer, etc.

Turning to the contents of the memory 916 in more detail, the memory 916 may include an operating system 926, one or more data stores 928, and/or one or more application programs, modules, or services for implementing the features disclosed herein, including a purchase service 930 and a return service 932, as described in detail above.

Figure 10:
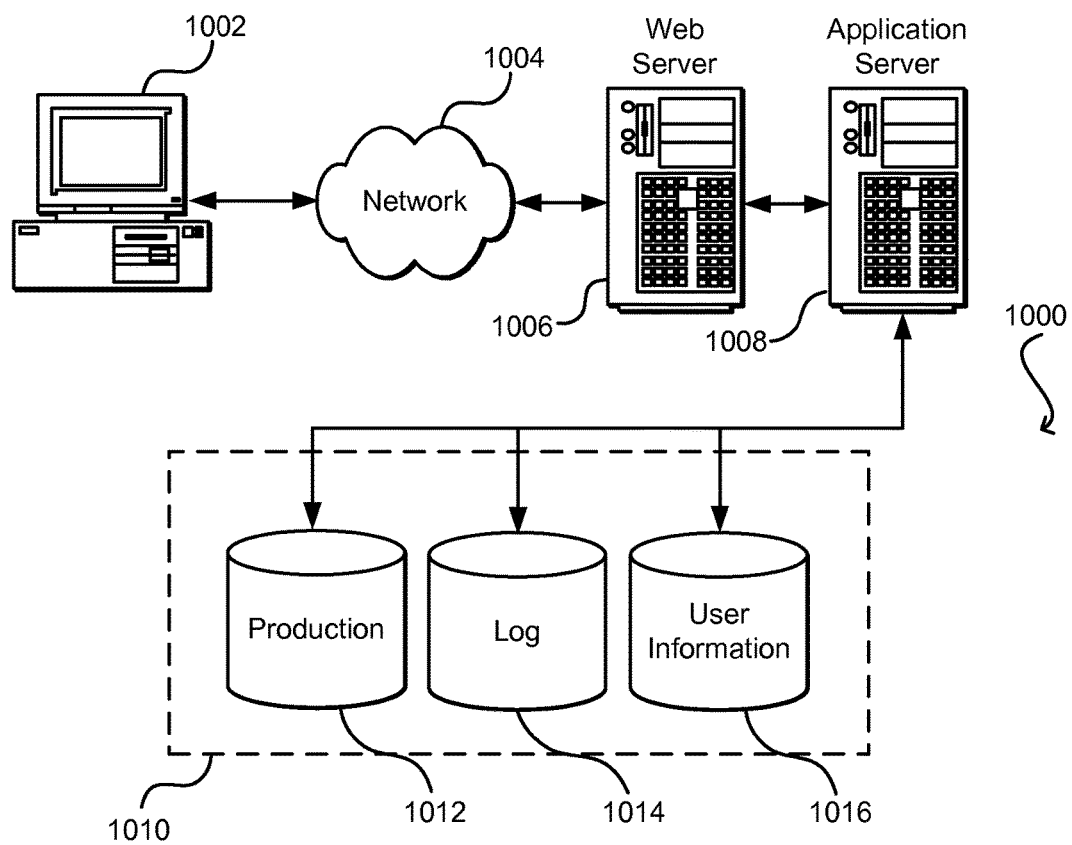
FIG. 10 illustrates another network environment in which various embodiments can be implemented.

FIG. 10 illustrates aspects of another example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
during at least one communication session between a user computing device and a server computer, the server computer configured to manage records of previous purchase transactions, each of the records including item information for at least one previously purchased item:
- identifying, by the server computer, a user account associated with the at least one communication session;
- displaying, by the server computer at the user computing device, first item information of a first order associated with the user account, the first item information associated with a first item that was purchased in the first order;
- receiving, by the server computer from the user computing device, first input indicating selection of the first item information;
- creating, by the server computer, an electronic return file associated with the user account, the electronic return file including first return information associated with the first item;
- displaying, by the server computer at the user computing device, second item information of a second order associated with the user account, the second order representing a separate transaction from the first order, and the second item information associated with a second item that was purchased in the second order;
- receiving, by the server computer from the user computing device, second input indicating selection of the second item information;
- modifying the electronic return file to include second return information associated with the second item;
- receiving, by the server computer from the user computing device, third input indicating selection of a third item to be purchased, the third item being associated with third item information;
- in response to receiving, by the server computer from the user computing device, an indication to process a combined transaction, processing the combined transaction by:
  - processing an electronic purchase order for the third item; and
  - processing the electronic return file as a combined return of the first item and the second item by:
    - obtaining first shipping information associated with the first item and second shipping information associated with the second item;
    - determining that the first item and the second item will be returned together based at least in part on the first shipping information and the second shipping information; and
    - causing generation of a single shipping label for shipping the first item and the second item based at least in part on said determining.

2. The computer-implemented method of claim 1, wherein the electronic return file is stored in association with the user account, the method further comprising at least one of:
- after termination of the at least one communication session, receiving a user request, during another communication session, to process the combined transaction using the stored electronic return file.

3. The computer-implemented method of claim 1, wherein processing the electronic return file as a combined return further includes:
- generating a verification record that indicates that the first item and the second item are expected to be returned together.

4. The computer-implemented method of claim 1, wherein:
- displaying, by the server computer at the user computing device, the first item information based at least in part on receiving first scanned information from the user computing device and identifying the first order based at least in part on the first scanned information; and
- displaying, by the server computer at the user computing device, the second item information based at least in part on receiving second scanned information from the user computing device and identifying the second order based at least in part on the second scanned information.

5. The computer-implemented method of claim 4, wherein the first scanned information includes at least one of a bar code associated with the first item, or a bar code associated with the first order.

6. The computer-implemented method of claim 1, wherein the first input and the second input are received from different user computing devices.

7. The computer-implemented method of claim 1, further comprising identifying a substitute item to be exchanged for at least one of the first item or the second item.

8. The computer-implemented method of claim 1, further comprising generating and sending a reminder to an address associated with the user account, the reminder including at least one of an indication that the electronic return file has not been processed, or an indication that at least one of the first item or the second item has not been received after the electronic return file has been processed,
- wherein the address includes at least one of an email address, a messaging address, or a dynamic address generated during another communication session associated with the user account.

9. A computer system, comprising:
- a memory that stores computer-executable instructions;
- a network interface; and
- a processor configured to access the memory and execute the computer-executable instructions to case the computer system to at least:
  - identify a user account associated with at least one communication session between a user computing device and a server computer;
  - receive, via the user computing device, first input indicating selection of a first item that was purchased in a first order associated with the user account;
  - based at least in part on the first input, generate an electronic return file associated with the user account, the electronic return file including first return information associated with the first item;
  - receive, via the user computing device, second input indicating selection of a second item that was purchased in a second order associated with the user account, the second order representing a separate transaction from the first order;
  - based at least in part on the second input, modify the electronic return file to include second return information associated with the second item;
  - receive, via the user computing device, third input indicating selection of a third item to be purchased;
  - in response to receiving, from the user computing device, an indication to process a combined transaction, process the combined transaction, wherein processing the combined electronic transaction causes the computer system to:
    - process an electronic purchase order for the third item; and process the return file as a combined return of the first item and the second item, wherein processing the return file causes the processor to:
obtain first shipping information associated with the first item and second shipping information associated with the second item;
determine that the first item and the second item will be returned together based at least in part on the first shipping information and the second shipping information; and
cause generation of a single shipping label based at least in part on said determining.

10. The system of claim 9, further comprising computer-executable instructions for causing generation of a window for display on the user computing device, the window including indicia of the first item, the second item, and the third item.

11. The system of claim 9, further comprising computer-executable instructions for:
receiving confirmation that the first item and the second item have been received at a receiving location; and
based at least in part on said confirmation, at least one of processing a refund in association with the user account, or shipping a replacement item to an address associated with the user account.

12. The system of claim 9, further comprising computer-executable instructions to
identify a substitute item to be exchanged for at least one of the first item or the second item.

13. A computer-implemented method, comprising:
during at least one communication session between a user computing device and a server computer, the server computer being configured to manage listings of items for sale and records of previous purchase transactions, each of the records including item information for at least one previously purchased item:
identifying, by the server computer, a user account associated with the at least one communication session;
receiving, by the server computer via the user computing device, first input indicating selection of a first item that was purchased in a first order associated with the user account;
based at least in part on the first input, generating an electronic return file associated with the user account, the electronic return file including first return information associated with the first item;
receiving, by the server computer via the user computing device, second input indicating selection of a second item to be purchased in association with the user account;
based at least in part on the second input, generating, by the server computer, a purchase order associated with the user account, the purchase order including purchase information associated with the second item;
causing, by the server computer, presentation of combined transaction information at the user computing device, the combined transaction information comprising the first return information of the electronic return file and the purchase information associated with the second item;
receiving, by the server computer via the user computing device, a third input indicating acceptance of the combined transaction information; and
based at least in part on said third input, processing, by the server computer, the combined transaction utilizing the combined transaction information.

14. The computer-implemented method of claim 13, wherein causing presentation of the combined transaction information comprises generating a combined return and purchase window for display at the user computing device based at least in part on the electronic return file and the purchase order, the combined return and purchase window including indicia of the first item and the second item, and a user-selectable icon for receiving the third input.

15. The computer-implemented method of claim 13, wherein processing the combined transaction includes:
generating, by the server computer, a shipping label for returning the first item to a receiving location;
determining whether the second item will be shipped independently of receiving the first item at the receiving location, or dependent on receiving the first item at the receiving location; and
shipping the second item to an address associated with the user account based at least in part on said determining.

16. The computer-implemented method of claim 15, wherein said determining is based on at least one of a preexisting user preference, a user selection for the combined transaction, price information associated with the first item, price information associated with the second item, shipping information associated with the first item, or shipping information associated with the second item.

17. The computer-implemented method of claim 13, further comprising processing a payment for the second item, the payment associated with the user account and based at least in part on return price information associated with the first item.

18. The computer-implemented method of claim 13, further comprising:
receiving, by the server computer via the user computing device, another input indicating selection of a third item that was purchased in a second order associated with the user account, the second order representing a separate transaction from the first order;
based at least in part on the another input, modifying the electronic return file to include additional return information associated with the third item prior to said processing.

* * * * *